2,735,859
DEHYDROCHLORINATION OF POLYCHLOROALKYL CHLOROSILANES EMPLOYING ALIPHATIC DINITRILE COMPOUNDS

George H. Wagner, Clarence, N. Y., assignor to Union Carbide and Carbon Corporation, a corporation of New York No Drawing. Application June 29, 1954,
Serial No. 440,295

8 Claims. (Cl. 260—448.2)

This invention relates to a process for preparing chloroalkenyl chlorosilanes from polychloroalkyl chlorosilanes. More particularly, the invention relates to an improved method for dehydrochlorinating polychloroalkyl chlorosilanes whereby chloroalkenyl chlorosilanes are prepared at higher production rates, in purer form and in greater yields than by any method known heretofore.

The polychloroalkyl chlorosilanes suitable as starting materials in the preparation of chloroalkenyl chlorosilanes are those which contain a single chlorine atom bonded to the beta carbon atom of the polychloroalkyl substituent group, and a single chlorine atom bonded to an adjacent carbon atom of said group. Typical of the polychloroalkyl chlorosilanes which may be dehydrochlorinated in accordance with the instant invention are alpha, beta-dichloroethyl trichlorosilane; alpha, beta-dichloropropyl trichlorosilane; beta, gamma-dichloropropyl trichlorosilane; alpha, beta-dichloroethyl ethyl dichlorosilane; alpha, beta-dichloroethyl diethyl monochlorosilane and the like.

The removal of hydrogen chloride from polychloroalkyl chlorosilanes is ordinarily accomplished by reacting the latter compounds with bases, for example the tertiary amines such as quinoline or picoline in an amount chemically equivalent to or in excess of the hydrogen chloride to be removed. Such reactions may be illustrated by the following equation representing the dehydrochlorination of alpha, beta-dichloroethyl trichlorosilane:

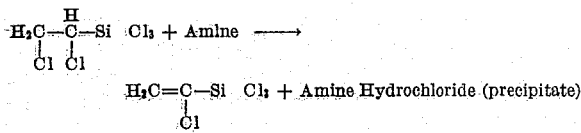

H₂C=C—Si Cl₃ + Amine Hydrochloride (precipitate)
       |
       Cl

The known processes of this type relating to the removal of hydrogen chloride from polychloroalkyl chlorosilanes, particularly dichloroalkyl chlorosilanes, to form chloroalkenyl chlorosilanes are attended with certain serious disadvantages. For example the use of excess or even theoretical quantities of the required bases is almost prohibitive in cost from the commercial standpoint. Moreover, the products from such reactions have been impure and the yields low due to the production of by-products and resinous materials. In addition it has been found that the use of excess or even theoretical quantities of the required bases creates difficulties in handling the separation of the desired chloroalkenyl chlorosilane product from the amine hydrochloride product. This is particularly true in operations wherein large quantities of polychloroalkyl chlorosilanes are dehydrochlorinated.

The present invention provides a method whereby chloroalkenyl chlorosilanes may be produced in a pure state at production rates far greater than any obtainable heretofore and wherein the formation of appreciable amounts of by-products or resinous materials is avoided.

In accordance with the present invention polychloroalkyl chlorosilanes containing a single chlorine atom bonded to the beta carbon atom of the polychloroalkyl substituent group and a chlorine atom bonded to an adjacent carbon atom in said group are dehydrochlorinated by heating said compounds in the presence of small amounts of an aliphatic dinitrile at temperatures of from about 150° C. to about 220° C., and generally under reflux to evolve hydrogen chloride and removing the evolved hydrogen chloride from the reaction mixture.

As the starting materials employed in the process contained in the polychloroalkyl substituent group a single chlorine atom bonded to the beta carbon atom of said group and another chlorine atom bonded to an adjacent carbon atom of said group, dehydrochlorination results in the preparation of compounds containing an olefinic unsaturation between the alpha and beta carbon atoms or between the beta and gamma carbon atoms of such substituent group. These products will also generally have a chlorine atom bonded to a carbon atom exhibiting the olefinic linkage. Thus for example, in the dehydrochlorination of alpha, beta-dichloroethyl trichlorosilane by my process there is obtained alpha-chlorovinyl trichlorosilane. Likewise in the dehydrochlorination of alpha, beta-dichloropropyl trichlorosilane there is obtained 1-chloro-1-propenyl trichlorosilane.

When dehydrochlorinating compounds containing chlorine atoms in the beta and gamma positions of the polychloroalkyl substituent group, such as beta, gamma-dichloropropyl trichlorosilane there is obtained a mixture of 3-chloro-1-propenyl trichlorosilane and 3-chloro-2-propenyl trichlorosilanes. Dehydrochlorination of polychloroalkyl chlorosilanes containing one or two alkyl groups bonded to the silicon atom of the compund in place of one or two of the chlorine atoms is conducted in the identical manner disclosed above, such alkyl groups do not affect the course of the reaction nor are they affected by it.

The aliphatic dinitriles suitable for use in the process have the structural formula:

$$N{\equiv}C-R-C{\equiv}N$$

where R is an alkylene radical containing from two to eight carbon atoms and includes such compounds as succinonitrile, glutaronitrile, adiponitrile, pimelonitrile, suberonitrile, and the like. In general, the dinitrile compounds may be employed in the process of this invention in an amount of from about one per cent to about twenty per cent by weight of the chlorosilane and preferably they are employed in an amount by weight of from about one per cent to about five per cent.

The mechanism of the process of the invention whereby the aliphatic dinitriles may be employed to effect dehydrochlorination of the polychloroalkyl chlorosilanes is not clearly understood. However, it is known that during the reaction the evolved hydrogen chloride must be immediately removed from the reaction zone as otherwise it will react with the aliphatic dinitriles. This has been shown by the fact that when bubbling hydrogen chloride into a mixture of a dichloroalkyl chlorosilane and adiponitrile dehydrochlorination does not occur upon subjecting this system to the conditions of the instant process. Hydrogen chloride and the aliphatic dinitriles apparently react to form imidochlorides as follows:

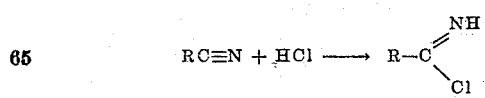

The above imidochlorides are not dehydrochlorinating compounds and thus not within the scope of the invention. The reaction of the instant invention may however be illustrated by the following equation representing the dehydrochlorination of alpha, beta-dichloroethyl trichlorosilane:

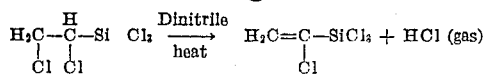

Those conditions defined above with respect to temperature and aliphatic dinitrile concentrations, under which dichloroalkyl chlorosilanes are dehydrochlorinated, are critical for the effective operation of the process. Specifically if the process is conducted at temperatures below about 150° C. dehydrochlorination does not take place. If, on the other hand, the process is conducted at temperatures above about 220° C. relatively small yields of the chloroalkenyl chlorosilanes are obtained. The latter result is attributable to the fact that at such higher temperatures side reactions between the polychloroalkyl chlorosilanes and the aliphatic dinitriles take place and not only result in the preparation of undesirable products but also in destroying the effectiveness of the nitriles for the purpose of dehydrochlorination.

With respect to the amount of the aliphatic dinitriles which are employed in the process of the instant invention it has been found that concentrations thereof above about twenty per cent by weight may oftentimes raise the temperatures required for reflux above about 220° C. As hereinabove disclosed, such temperatures are not conducive for the effective operation of the process.

One method of conducting the process of the invention involves charging a dichloroalkyl chlorosilane such as alpha, beta-dichloroethyl trichlorosilane and an appropriate amount of an aliphatic dinitrile such as pimelonitrile to a flask connected to a distilling column and heating the mixture to a temperature within the range set forth above. Hydrogen chloride gas is evolved from the reaction mixture, passes through the column and is vented at the head of the column and may be recovered as a valuable product of the reaction. Heating of the mixture is continued until the evolution of hydrogen chloride ceases. After heating there remains in the flask for the specific instance referred to a mixture comprising alpha-chlorovinyl trichlorosilane with small amounts of pimelonitrile. Alpha-chlorovinyl trichlorosilane may then be readily separated from the mixture.

The preferred embodiment of the invention comprises conducting the reaction under reflux conditions at a temperature of from about 150° C. to about 220° C. and providing for the removal of the products of the reaction in a single operation. This is possible as the choroalkenyl chlorosilane product normally has a boiling point below the reflux temperature of the reaction mixture. In the practice of this embodiment of the invention the reaction may be conducted by heating a dichloroalkyl chlorosilane and an aliphatic dinitrile to reflux in a flask connected to a distilling column provided with a still head and receiver. Shortly after reflux conditions are established the gaseous products of the reaction mixture pass to the still head where the hydrogen chloride product is vented to a hood and the gaseous chlorosilane product condensed and passed to a receiver. If desired, only a portion of the chlorosilane product obtained at the still head may be passed to the receiver with the remaining portion returned to the column. By conducting the reaction in this manner the process may be made continuous by providing means for the controlled addition of the chloroalkyl chlorosilane to the reaction mixture at a rate equal to that at which the products are collected. In this manner small amounts of the aliphatic dinitrile may be employed to dehydrochlorinate large quantities of chloroalkyl chlorosilanes.

The following examples are illustrative of the invention:

Example 1

To a round bottom flask connected to a distilling column, packed 12 inches of its length with ⅛ inch glass helices, equipped with a still head and receiver were charged 130 grams of beta, gamma-dichloropropyl trichlorosilane and 9.5 grams of adiponitrile. The mixture was heated to reflux (flask temperature approximately 210° C.). Shortly after reflux conditions were established the gaseous products of the reaction passed to the still head with the hydrogen chloride product vented to a hood and only a portion of the condensed gamma-chloropropenyl trichlorosilane product collected in the receiver with the remaining portion returned to the column. Heating was continued until the evolution of hydrogen chloride ceased. There was obtained 55 grams of gamma-chloropropenyl trichlorosilane product.

Example 2

To a round bottom flask connected to a distilling column, packed 12 inches of its length with ⅛ inch glass helices, equipped with a still head and receiver were charged 138 grams of alpha, beta-dichloropropyl trichlorosilane and 9.5 grams of adiponitrile. The mixture was heated to reflux (flask temperature approximately 210° C.). Shortly after reflux conditions were established the gaseous products of the reaction passed to the still head with the hydrogen chloride product vented to a hood and only a portion of the condensed 1-chloro-1-propenyl trichlorosilane product collected in the receiver with the remaining portion returned to the column. Heating was continued until the evolution of hydrogen chloride ceased. This reaction was completed within four hours and there was obtained 56 grams of 1-chloro-1-propenyl trichlorosilane.

Example 3

To a round bottom flask connected to a distilling column, packed 12 inches of its length with ⅛ inch glass helices, equipped with a still head and receiver were charged 155 grams of alpha, beta-dichloroethyl trichlorosilane and 7 grams of adiponitrile. The mixture was heated to reflux (flask temperature 175° C.–180° C.). Shortly after reflux conditions were established the gaseous products of the reaction passed to the still head with the hydrogen chloride product vented to a hood and only a portion of the condensed alpha-chlorovinyl trichlorosilane product collected in the receiver with the remaining portion returned to the column. Refluxing was continued until the evolution of hydrogen chloride ceased which required a period of approximately 18 hours. There was obtained 71.6 grams of alpha-chlorovinyl trichlorosilane.

Example 4

To a round bottom flask connected to a distilling column, packed 12 inches of its length with ⅛ inch glass helices, equipped with a still head and receiver were charged 112 grams of alpha, beta-dichloroethyl ethyl dichlorosilane and 9.5 grams of adiponitrile. The mixture was heated to reflux (flask temperature approximately 215° C.). Shortly after reflux conditions were established the gaseous products of the reaction passed to the still head with the hydrogen chloride product vented to a hood and only a portion of the condensed alpha-chlorovinyl ethyl dichlorosilane product collected in the receiver with the remaining portion returned to the column. Heating was continued until the evolution of hydrogen chloride ceased which required a period of approximately three hours. There was obtained 26 grams of alpha-chlorovinyl ethyl dichlorosilane.

What is claimed is:

1. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said polychloroalkyl chlorosilane with from about one per cent to about twenty per cent by weight of said polychloroalkyl chlorosilane of an aliphatic dinitrile having the formula:

$$N \equiv C - R - C \equiv N$$

where R is an alkylene radical containing from two to eight carbon atoms, at a temperature of from about 150° C. to about 220° C. to evolve hydrogen chloride and removing said hydrogen chloride from the reaction zone.

2. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said polychloroalkyl chlorosilane with from about one per cent to about twenty per cent by weight of said polychloroalkyl chlorosilane of an aliphatic dinitrile having the formula:

$$N \equiv C - R - C \equiv N$$

where R is an alkylene radical containing from two to eight carbon atoms, at a temperature of from about 150° C. to about 220° C. under reflux conditions and removing hydrogen chloride and the unsaturated derivative of said polychloroalkyl chlorosilane from the reaction zone.

3. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said polychloroalkyl chlorosilane with from about one per cent to about twenty per cent by weight of said polychloroalkyl chlorosilane of adiponitrile at a temperature of from about 150° C. to about 220° C. to evolve hydrogen chloride and removing said hydrogen chloride from the reaction zone.

4. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilanes being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said polychloroalkyl chlorosilane with from about one percent to about twenty per cent by weight of said polychloroalkyl chlorosilane of adiponitrile at a temperature of from about 150° C. to about 220° C. under reflux conditions and removing hydrogen chloride and the unsaturated derivative of said chloroalkyl chlorosilane from the reaction zone.

5. A process of dehydrochlorinating beta, gamma-dichloropropyl trichlorosilane which comprises heating said beta, gamma-dichloropropyl trichlorosilane with from about one per cent to about twenty per cent by weight of said chlorosilane of adiponitrile at a temperature of from about 150° C. to about 220° C. under reflux conditions and removing hydrogen chloride and gamma-chloropropenyl trichlorosilane from the reaction mixture.

6. A process of dehydrochlorinating alpha, beta-dichloropropyl trichlorosilane which comprises heating said alpha, beta dichloropropyl trichlorosilane with from about one per cent to about twenty per cent by weight of said chlorosilane of adiponitrile at a temperature of from about 150° C. to about 220° C. under reflux conditions and removing hydrogen chloride and 1-chloro-1-propenyl trichlorosilane from the reaction zone.

7. A process of dehydrochlorinating alpha, beta-dichloroethyl trichlorosilane which comprises heating said alpha, beta-dichloroethyl trichlorosilane with from about one per cent to about twenty per cent by weight of said chlorosilane of adiponitrile at a temperature of from about 150° C. to about 220° C. under reflux conditions and removing hydrogen chloride and alpha-chlorovinyl trichlorosilane from the reaction zone.

8. A process of dehydrochlorinating alpha, beta-dichloroethyl ethyl dichlorosilane which comprises heating said alpha, beta-dichloroethyl ethyl dichlorosilane with from about one percent to about twenty per cent by weight of said chlorosilane of adiponitrile at a temperature of from about 150° C. to about 220° C. under reflux conditions and removing hydrogen chloride and alpha-chlorovinyl ethyl dichlorosilane from the reaction zone.

No references cited.